US012405651B2

United States Patent
Nemani et al.

(10) Patent No.: US 12,405,651 B2
(45) Date of Patent: Sep. 2, 2025

(54) AUTONOMOUSLY MANAGING CORE CLUSTER FREQUENCIES USING PERFORMANCE STATISTICS IN PROCESSOR DEVICES

(71) Applicant: QUALCOMM Incorporated, San Diego, CA (US)

(72) Inventors: Mahadevamurty Nemani, San Diego, CA (US); Anubhav Mishra, Fremont, CA (US); Arun Sukheja, San Diego, CA (US); Nitin Makhija, San Jose, CA (US); Adarsh Baraka Ravi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 18/468,242

(22) Filed: Sep. 15, 2023

(65) Prior Publication Data

US 2025/0093931 A1     Mar. 20, 2025

(51) Int. Cl.
| | |
|---|---|
| G06F 1/00 | (2006.01) |
| G06F 1/28 | (2006.01) |
| G06F 9/445 | (2018.01) |

(52) U.S. Cl.
CPC ............ G06F 1/28 (2013.01); G06F 9/44505 (2013.01)

(58) Field of Classification Search
CPC ............................... G06F 1/28; G06F 9/44505
See application file for complete search history.

(56) References Cited

U.S. PATENT DOCUMENTS

| 2014/0095904 A1 | 4/2014 | Ananthakrishnan et al. |
| 2014/0149753 A1 | 5/2014 | Park et al. |

(Continued)

FOREIGN PATENT DOCUMENTS

WO      2015077305 A1      5/2015

OTHER PUBLICATIONS

International Search Report and Written Opinion for International Patent Application No. PCT/US2024/042109, mailed Nov. 19, 2024, 16 pages.

(Continued)

*Primary Examiner* — Xuxing Chen
(74) *Attorney, Agent, or Firm* — W&T

(57) ABSTRACT

Autonomously managing core cluster frequencies using performance statistics in processor devices is disclosed herein. In some aspects, a cluster power management circuit of a processor device collects Activity Management Unit (AMU) statistics for multiple processor cores for each of one or more frequency operating points over a time interval. Based on the AMU statistics, the cluster power management circuit generates a performance model representing processor performance as a function of frequency, and uses the performance model and a power consumption measurement to generate an energy-per-instruction (EI) model representing energy per instruction as a function of frequency. The cluster power management circuit then generates an advantage model based on a first rate of change of the performance model as a function of frequency and a second rate of change of the EI model as a function of frequency, and identifies a target frequency operating point based on the advantage model.

34 Claims, 8 Drawing Sheets

(56) References Cited

U.S. PATENT DOCUMENTS

| | | | |
|---|---|---|---|
| 2014/0215241 A1* | 7/2014 | Yoon | G06F 1/3275 |
| | | | 713/320 |
| 2017/0199558 A1 | 7/2017 | Farazmand et al. | |
| 2019/0041944 A1 | 2/2019 | Abu Salah et al. | |
| 2021/0026708 A1 | 1/2021 | Weissmann et al. | |
| 2024/0061492 A1* | 2/2024 | Park | G06F 1/3225 |
| 2025/0061042 A1* | 2/2025 | Krishnan | G06F 16/284 |

OTHER PUBLICATIONS

Fan K., et al., "Predictable GPUs Frequency Scaling for Energy and Performance", Association for Computing Machinery, ICPP 2019, Aug. 5-8, 2019, 10 Pages.

Ilager S., et al., "A Data-Driven Frequency Scaling Approach for Deadline-aware Energy Efficient Scheduling on Graphics Processing Units (GPUs)", arXiv: 2004.08177v2 [cs.DC], Apr. 28, 2020, 10 Pages.

Li J., et al., "A Two-Stage Strategy to Optimize Energy Consumption for Latency-Critical Workload Under QoS Constraint", Information Technology and Control, vol. 49, No. 4, 2020, pp. 608-621.

\* cited by examiner

AUTONOMOUSLY MANAGING CORE CLUSTER FREQUENCIES USING PERFORMANCE STATISTICS IN PROCESSOR DEVICES

BACKGROUND

I. Field of the Disclosure

The technology of the disclosure relates generally to power and performance management in multicore processor-based devices, and, in particular, to frequency management for clusters of processor cores of a processor device.

II. Background

Conventional processor devices may implement the Advanced Configuration and Power Interface (ACPI) specification, which defines an open industry standard that includes power management across the processor devices' hardware, operating systems (OSes), and application software. Version 5.0 of the ACPI specification includes a feature known as Collaborative Processor Performance Control (CPPC). CPPC provides an interface via which an OS executing on a processor device can manage performance of the processor device by sending a performance change request to, e.g., a power management circuit of the processor device. The power management circuit determines whether the requested performance level is supported, and, if so, the power management circuit updates the frequency and voltage at which the processor device operates. In this manner, performance hints provided by the OS can enable better power efficiency and more responsive frequency scaling by the processor device.

As part of providing power management functionality, the power management circuit of the processor device may monitor processor performance using Activity Management Units (AMUs) of the processor device. An AMU consists of a plurality of counters, implemented as system registers, that are used to track the occurrence of various processor events. These events may include, e.g., architected events such as processor cycles, retired instructions, memory stall cycles, and the like, as well as auxiliary events such as last-level cache (LLC) demand misses, LLC demand accesses, bus accesses, and the like.

The power management circuit of the processor device can employ statistics gathered from the AMU to determine whether a performance level requested by the OS is supported at a given time. However, the power management circuit of a conventional processor device may not be able to take into account the Quality-of-Service (QOS) requirements of executing workloads in making power management decisions.

SUMMARY OF THE DISCLOSURE

Aspects disclosed in the detailed description include autonomously managing core cluster frequencies using performance statistics in processor devices. Related apparatus, methods, and computer-readable media are also disclosed. In this regard, a processor device provides a plurality of core clusters that each comprise a plurality of processor cores and a cluster power management circuit. Each processor core includes an Activity Management Circuit (AMU) that is configured to collect AMU statistics on various aspects of processor core performance. The cluster power management circuit is configured to collect the AMU statistics from the plurality of AMUs for each frequency operating point of one or more frequency operating points over a time interval. The cluster power management circuit then generates, based on the plurality of AMU statistics, a performance model representing processor performance (measured as average instructions per clock cycle (IPC), as a non-limiting example) as a function of frequency. Some aspects may provide that generating the performance model comprises calculating, for each frequency operating point of the one or more frequency operating points, a performance value comprising a product of the frequency operating point multiplied by an average number of instructions per clock cycle at the frequency operating point.

The cluster power management circuit further generates, based on the performance model and a power consumption measurement, an energy-per-instruction (EI) model that represents energy per instruction as a function of frequency. In some aspects, generating the EI model may comprise calculating, for each frequency operating point of the one or more frequency operating points, an EI value comprising a quotient of power consumption at the frequency operating point divided by the performance value for the frequency operating point.

The cluster power management circuit next generates an advantage model based on a first rate of change of the performance model as a function of frequency and a second rate of change of the EI model as a function of frequency (e.g., by calculating a quotient of the first rate of change of the performance model as a function of frequency divided by the second rate of change of the EI model as a function of frequency). The cluster power management circuit identifies a target frequency operating point based on the advantage model, and transmits the target frequency operating point to a dynamic voltage and frequency scaling (DVFS) circuit of the processor device. According to some aspects, identifying the target frequency operating point may comprise determining a maximum frequency operating point that corresponds to an advantage value that is indicated by the advantage model as being greater than or equal to a threshold. Some such aspects may provide that determining the maximum frequency operating point comprises determining the maximum frequency operating point as an interpolated value between an energy balanced frequency operating point and a performance frequency operating point, based on an energy performance preference (EPP) hint.

Some aspects may provide that, once the DVFS circuit receives the target frequency operating point from the cluster power management circuit, the DVFS circuit sets a frequency of the core cluster based on the target frequency operating point. According to some aspects in which the target frequency operating point is higher than a current frequency of the core cluster, setting the frequency of the core cluster may comprise immediately raising the frequency of the core cluster. Some aspects in which the target frequency operating point is lower than the current frequency of the core cluster may provide that setting the frequency of the core cluster comprise incrementally lower the frequency of the core cluster.

In another aspect, a processor device is provided. The processor device comprises a core cluster that comprises a plurality of processor cores comprising a corresponding plurality of AMUs. The processor device also comprises a cluster power management circuit and a DVFS circuit. The cluster power management circuit is configured to collect a plurality of AMU statistics from the plurality of AMUs for each frequency operating point of one or more frequency operating points over a time interval. The cluster power management circuit is further configured to generate, based on the plurality of AMU statistics, a performance model representing processor performance as a function of frequency. The cluster power management circuit is also configured to generate, based on the performance model and a power consumption measurement, an EI model representing energy per instruction as a function of frequency. The cluster power management circuit is additionally configured to generate an advantage model based on a first rate of change of the performance model as a function of frequency and a second rate of change of the EI model as a function of frequency. The cluster power management circuit is further configured to identify a target frequency operating point based on the advantage model. The cluster power management circuit is also configured to transmit the target frequency operating point to the DVFS circuit.

In another aspect, a processor device is provided. The processor device comprises means for collecting a plurality of AMU statistics from a plurality of AMUs, corresponding to a plurality of processor cores of a core cluster of the processor device, for each frequency operating point of one or more frequency operating points over a time interval. The processor device further comprises means for generating, based on the plurality of AMU statistics, a performance model representing processor performance as a function of frequency. The processor device also comprises means for generating, based on the performance model and a power consumption measurement, an EI model representing energy per instruction as a function of frequency. The processor device additionally comprises means for generating an advantage model based on a first rate of change of the performance model as a function of frequency and a second rate of change of the EI model as a function of frequency. The processor device further comprises means for identifying a target frequency operating point based on the advantage model. The processor device also comprises means for transmitting the target frequency operating point to a DVFS circuit of the processor device.

In another aspect, a method for autonomously managing core cluster frequencies using performance statistics is provided. The method comprises collecting, by a cluster power management circuit of a processor device, a plurality of AMU statistics from a plurality of AMUs, corresponding to a plurality of processor cores of a core cluster of the processor device, for each frequency operating point of one or more frequency operating points over a time interval. The method further comprises generating, by the cluster power management circuit based on the plurality of AMU statistics, a performance model representing processor performance as a function of frequency. The method also comprises generating, by the cluster power management circuit based on the performance model and a power consumption measurement, an EI model representing energy per instruction as a function of frequency. The method additionally comprises generating, by the cluster power management circuit, an advantage model based on a first rate of change of the performance model as a function of frequency and a second rate of change of the EI model as a function of frequency. The method further comprises identifying, by the cluster power management circuit, a target frequency operating point based on the advantage model. The method also comprises transmitting, by the cluster power management circuit, the target frequency operating point to a DVFS circuit of the processor device.

In another aspect, a non-transitory computer-readable medium is disclosed. The non-transitory computer-readable medium stores computer-executable instructions that, when executed, cause a processor device of a processor-based device to collect a plurality of AMU statistics from a plurality of AMUs, corresponding to a plurality of processor cores of a core cluster of the processor device, for each frequency operating point of one or more frequency operating points over a time interval. The computer-executable instructions further cause the processor device to generate, based on the plurality of AMU statistics, a performance model representing processor performance as a function of frequency. The computer-executable instructions also cause the processor device to generate, based on the performance model and a power consumption measurement, an EI model representing energy per instruction as a function of frequency. The computer-executable instructions additionally cause the processor device to generate an advantage model based on a first rate of change of the performance model as a function of frequency and a second rate of change of the EI model as a function of frequency. The computer-executable instructions further cause the processor device to identify a target frequency operating point based on the advantage model. The computer-executable instructions also cause the processor device to transmit the target frequency operating point to a DVFS circuit of the processor device.

DETAILED DESCRIPTION

Figure 1:
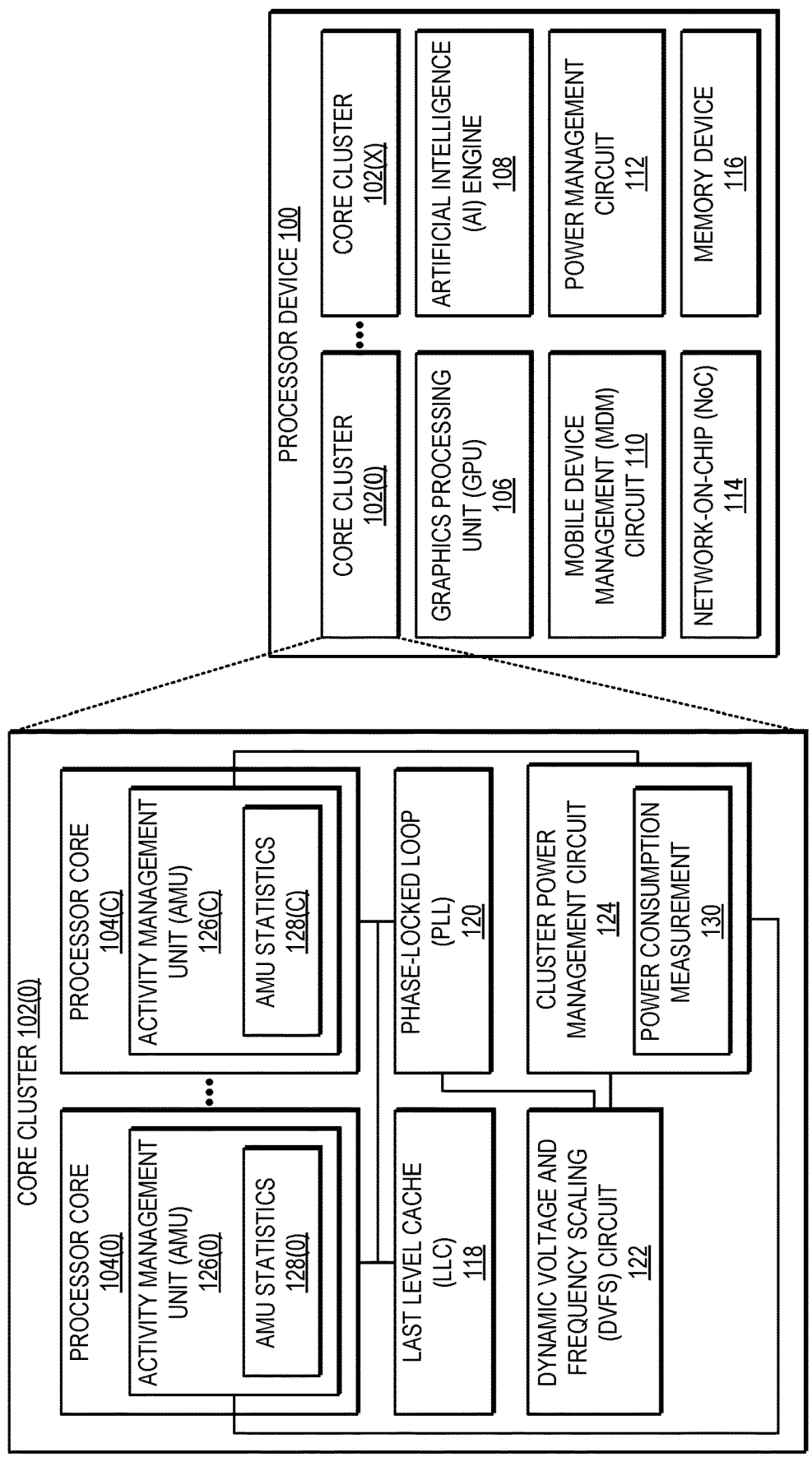
FIG. 1 is a block diagram of an exemplary processor-based device that includes a core cluster that comprises a cluster power management circuit configured to autonomously manage core cluster frequencies using performance statistics, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like are used herein to distinguish between similarly named elements, and are not to be interpreted as indicating an ordinal relationship between such elements unless expressly described as such herein.

Aspects disclosed in the detailed description include autonomously managing core cluster frequencies using performance statistics in processor devices. Related apparatus, methods, and computer-readable media are also disclosed. In this regard, a processor device provides a plurality of core clusters that each comprise a plurality of processor cores and a cluster power management circuit. Each processor core includes an Activity Management Circuit (AMU) that is configured to collect AMU statistics on various aspects of processor core performance. The cluster power management circuit is configured to collect the AMU statistics from the plurality of AMUs for each frequency operating point of one or more frequency operating points over a time interval. The cluster power management circuit then generates, based on the plurality of AMU statistics, a performance model representing processor performance (measured as average instructions per clock cycle (IPC), as a non-limiting example) as a function of frequency. Some aspects may provide that generating the performance model comprises calculating, for each frequency operating point of the one or more frequency operating points, a performance value comprising a product of the frequency operating point multiplied by an average number of instructions per clock cycle at the frequency operating point.

The cluster power management circuit further generates, based on the performance model and a power consumption measurement, an energy-per-instruction (EI) model that represents energy per instruction as a function of frequency. In some aspects, generating the EI model may comprise calculating, for each frequency operating point of the one or more frequency operating points, an EI value comprising a quotient of power consumption at the frequency operating point divided by the performance value for the frequency operating point.

The cluster power management circuit next generates an advantage model based on a first rate of change of the performance model as a function of frequency and a second rate of change of the EI model as a function of frequency (e.g., by calculating a quotient of the first rate of change of the performance model as a function of frequency divided by the second rate of change of the EI model as a function of frequency). The cluster power management circuit identifies a target frequency operating point based on the advantage model, and transmits the target frequency operating point to a dynamic voltage and frequency scaling (DVFS) circuit of the processor device. According to some aspects, identifying the target frequency operating point may comprise determining a maximum frequency operating point that corresponds to an advantage value that is indicated by the advantage model as being greater than or equal to a threshold. Some such aspects may provide that determining the maximum frequency operating point comprises determining the maximum frequency operating point as an interpolated value between an energy balanced frequency operating point and a performance frequency operating point, based on an energy performance preference (EPP) hint.

Some aspects may provide that, once the DVFS circuit receives the target frequency operating point from the cluster power management circuit, the DVFS circuit sets a frequency of the core cluster based on the target frequency operating point. According to some aspects in which the target frequency operating point is higher than a current frequency of the core cluster, setting the frequency of the core cluster may comprise immediately raising the frequency of the core cluster. Some aspects in which the target frequency operating point is lower than the current frequency of the core cluster may provide that setting the frequency of the core cluster comprise incrementally lower the frequency of the core cluster.

In this regard, FIG. 1 is a block diagram of an exemplary processor device 100 (also referred to a "processor" or a "CPU"). The processor device 100 may comprise an in-order or an out-of-order processor (OoP), and/or may be one of a plurality of processor devices 100. Examples of the processor device 100 may include, but are not limited to, a digital signal processor (DSP), general-purpose microprocessor, application specific integrated circuit (ASIC), field programmable logic array (FPGA), or other equivalent integrated or discrete logic circuitry.

As seen in FIG. 1, the processor device 100 comprises a plurality of core clusters 102(0)-102(X), each of which comprises a plurality of processor cores such as the processor cores 104(0)-104(C) of the core cluster 102(0). The processor device 100 of FIG. 1 also comprises a graphics processing unit (GPU) 106 for performing graphical operations. As a non-limiting example, the GPU 106 may comprise a dedicated hardware unit having fixed functionality and programmable components for rendering graphics and executing GPU applications. The GPU 106 may also include a DSP, general-purpose microprocessor, ASIC, FPGA, or other equivalent integrated or discrete logic circuitry, which are not shown in FIG. 1 for the sake of clarity.

The processor device 100 of FIG. 1 further comprises additional exemplary elements, including an artificial intelligence (AI) engine 108, a mobile device management (MDM) circuit 110, a power management circuit 112, a network-on-chip (NoC) 114, and a memory device 116. The AI engine 108 of the processor device 100 comprises circuitry and logic for providing AI-based functionality such as search, speech recognition, text and/or image generation, and the like, as non-limiting examples. The MDM circuit 110 provides functionality for provisioning, configuring, updating, and/or securing a mobile device into which the processor device 100 is integrated. The power management circuit 112 provides high-level performance and power management functionality for the processor device 100 as a whole, while the NoC 114 is configured to manage communications between the different devices that comprise the processor device 100. Finally, the memory device 116 provides storage of and access to data used by the processor device 100, and, in some aspects, may comprise a Double Data Rate (DDR) Synchronous Dynamic Random-Access Memory (SDRAM) device, as a non-limiting example.

FIG. 1 also illustrates exemplary elements of the core cluster 102(0) in greater detail. The processor cores 104(0)-104(C) of the core cluster 102(0) are communicatively coupled to a last-level cache (LLC) 118 that stores frequently-accessed data for quicker access, and to a phase-locked loop (PLL) 120 that provides a clock signal to the processor cores 104(0)-104(C) and the LLC 118. The frequency and voltage at which the processor cores 104(0)-104(C) of the core cluster 102(0) operate is controlled by a DVFS circuit 122, and performance and power management for the core cluster 102(0) is handled by a cluster power management circuit 124. It is to be understood that, while FIG. 1 only shows exemplary elements of the core cluster 102(0), each of the core clusters 102(0)-102(X) include elements corresponding to the illustrated elements of the core cluster 102(0). Because the processor cores 104(0)-104(C) and the LLC 118 all operate using a same clock signal generated by the PLL 120, the core cluster 102(0) is be considered to be a "synchronized" core cluster.

In the example of FIG. 1, the processor device 100 is configured to provide performance and power management functionality such as that defined by the Collaborative Processor Performance Control (CPPC) of version 5 of the Advanced Configuration and Power Interface (ACPI) specification. To provide performance monitoring in support of such performance and power management functionality, each of the processor cores 104(0)-104(C) of the core cluster 102(0) comprises a corresponding AMU 126(0)-126(C). It is to be understood that, although FIG. 1 only shows a single AMU 126(0)-126(C) for each of the processor cores 104(0)-104(C), in some aspects the processor cores 104(0)-104(C) each may comprise multiple AMUs 126(0)-126(C).

The AMUs 126(0)-126(C) are each made up of system registers (not shown) that correspond to different architectural events or auxiliary events, and that are configured to store counters that are incremented by the AMU 126(0)-126(C) on the occurrence of the corresponding event. The counter values stored in the AMU 126(0)-126(C) are collectively represented in FIG. 1 and referred to herein as "AMU statistics 128(0)-128(C)" or "performance statistics 128(0)-128(C)." The AMU statistics 128(0)-128(C) may comprise any data that is collected by the AMUs 126(0)-126(C) with regard to occurrences of architectural events or auxiliary events related to aspects of performance of the processor cores 104(0)-104(C).

Table 1 below lists exemplary architectural and auxiliary events that may comprise the AMU statistics 128(0)-128(C):

TABLE 1

| Type of Event | Event Name | Event Description |
|---|---|---|
| Architectural | CPU_CYCLES | Count of processor frequency cycles |
| Architectural | CNT_CYCLES | Count of constant frequency cycles |
| Architectural | INST_RETIRED | Count of instructions retired |
| Architectural | STALL_FRONTEND | Count of no operation (NOP) issued due to the frontend |
| Architectural | STALL_BACKEND_MEM | Count of memory stall cycles |
| Auxiliary | L2D_CACHE_MISS | Total demand misses in last level cache (LLC) |
| Auxiliary | STALL_FRONTEND_MEMBOUND | Count of front-end stalls that are memory-bound |
| Auxiliary | L2D_CACHE | Total number of demand accesses |
| Auxiliary | BUS_ACCESS | Total number of bus accesses (read and write) |
| Auxiliary | BUS_ACCESS_CYCLES | Total number of bus access cycles (note that BUS_ACCESS_CYCLES divided by BUS_ACCESS will give average latency for a transaction to complete on bus) |
| Auxiliary | INST_SPEC | Count of speculatively executed instructions |

The processor device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor device 100 and/or the processor cores 104(0)-104(C) may include elements in addition to those illustrated in FIG. 1, and/or may include more or fewer of the elements illustrated in FIG. 1. For example, the processor device 100 may further include caches, controllers, communications buses, and/or persistent storage devices, which are omitted from FIG. 1 for the sake of clarity.

As noted above, the cluster power management circuit 124 may employ the AMU statistics 128(0)-128(C) gathered from the AMUs 126(0)-126(C) to determine whether a performance level requested by an operating system (OS) being executed by the processor device 100 is supported at a given time. However, a conventional cluster power management circuit may not be able to take into account the Quality-of-Service (QoS) requirements of workloads being executed by the processor cores 104(0)-104(C) in making power management decisions for the core cluster 102(0).

In this regard, the cluster power management circuit 124 is configured to autonomously manage core cluster frequencies using performance statistics (i.e., the AMU statistics 128(0)-128(C) of FIG. 1). In exemplary operation, the cluster power management circuit 124 of the processor device 100 collects the plurality of AMU statistics 128(0)-128(C) from the plurality of AMUs 126(0)-126(C) for each frequency operating point of one or more frequency operating points (not shown) over a time interval. Each frequency operating point represents a processor frequency at corresponding voltage at which the core cluster 102(0) operates during the time interval. The time interval in some aspects may be programmable by an OS or application software.

Based on the AMU statistics 128(0)-128(C), the cluster power management circuit 124 generates a performance model (not shown) that represents processor performance as a function of frequency. The cluster power management circuit 124 also generates an EI model (not shown) that represents energy per instruction as a function of frequency, based on the performance model and a power consumption measurement 130 that indicates power consumed at the frequency and voltage used during the time interval. Finally, the cluster power management circuit 124 generates an advantage model (not shown) based on a first rate of change of the performance model as a function of frequency and a second rate of change of the EI model as a function of frequency. The generation of an exemplary performance model, an exemplary EI model, and an exemplary advantage model in some aspects are discussed below in greater detail with respect to FIGS. 2, 3, and 4, respectively.

The cluster power management circuit 124 then identifies a target frequency operating point (not shown) based on the advantage model. This may comprise, for example, determining a maximum frequency operating point that corresponds to an advantage value that is indicated by the advantage model as being greater than or equal to a threshold that corresponds to a QoS hint from an OS. As used herein, a QoS hint refers to an indication from the OS to a corresponding processor core of the processor cores 104(0)-104(C) that a workload executing on the processor core requires a particular QoS level. After identifying the target frequency operating point, the cluster power management circuit 124 transmits the target frequency operating point to the DVFS circuit 122, which may then set a frequency of the core cluster 102(0) based on the target frequency operating point. In aspects in which the target frequency operating point is higher than a current frequency of the core cluster 102(0), the DVFS circuit 122 may be configured to set the frequency of the core cluster 102(0) by immediately raising the frequency of the core cluster 102(0). Some aspects in which the target frequency operating point is lower than the current frequency of the core cluster 102(0) may provide that the DVFS circuit 122 is configured to set the frequency of the core cluster 102(0) by incrementally lower the frequency of the core cluster 102(0) (i.e., by gradually lowering the frequency of the core cluster 102(0) over a number of time intervals rather than immediately lowering the frequency of the core cluster 102(0)).

Figure 2:
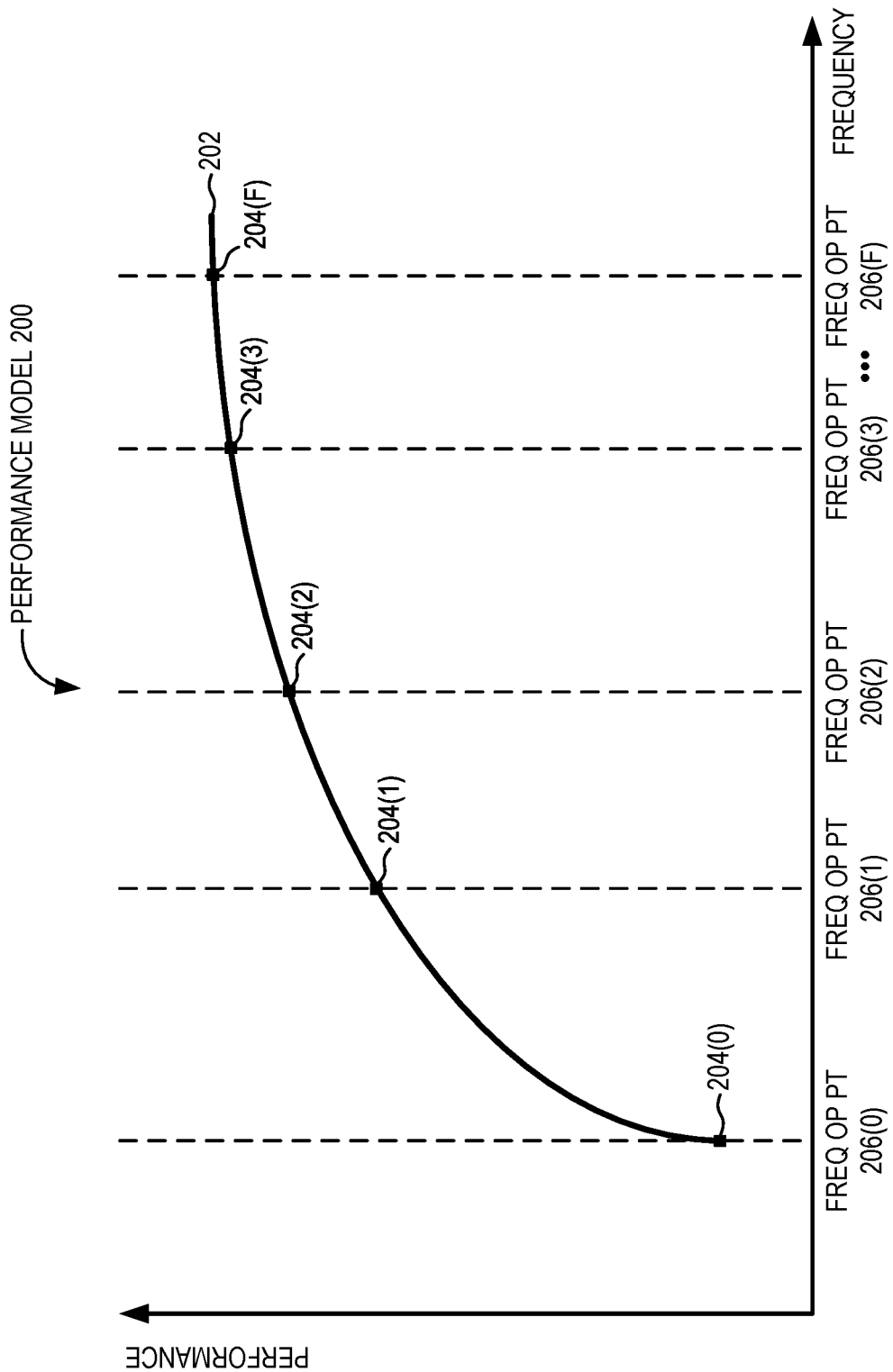
FIG. 2 is a diagram illustrating an exemplary performance model generated by the cluster power management circuit of FIG. 1, according to some aspects.

As noted above, in performing autonomous management of the frequency of the core cluster 102(0), the cluster power management circuit 124 uses the AMU statistics 128(0)-128(C) to generate a performance model that represents processor performance as a function of frequency. In this regard, FIG. 2 illustrates an exemplary performance model 200 according to some aspects. The performance model 200 comprises a curve 202 that is generated to fit a plurality of performance values 204(0)-204(F) that are calculated by the cluster power management circuit 124 of FIG. 1 for each of a corresponding plurality of frequency operating points (captioned as "FREQ OP PT" in FIG. 2) 206(0)-206(F) during the time interval. As seen in FIG. 2, the frequency operating points 206(0)-206(F) are illustrated by vertical dotted lines arranged along a horizontal frequency axis, while the performance values 204(0)-204(F) are illustrated as points on each vertical dotted line along a vertical performance axis.

In the example of FIG. 2, each of the performance values 204(0)-204(F) indicates an average instructions per clock cycle (IPC) value for the corresponding frequency operating point 206(0)-206(F). The cluster power management circuit 124 in some aspects may calculate the performance values 204(0)-204(F) using the AMU statistics 128(0)-128(C) in FIG. 1 comprising the architectural events and auxiliary events referenced above in Table 1. For example, the performance values 204(0)-204(F) may be calculated using the equations illustrated below in Table 2, which may refer to architectural events and/or auxiliary events (e.g., BUS_ACCESS, INSTR_RETIRED, and the like) described above in Table 1:

TABLE 2

| Equation Description | Equation |
| --- | --- |
| Average Latency of a Transaction on the Bus | AVG_BUS_ACCESS_LATENCY = BUS_ACCESS_CYCLES/BUS_ACCESS |
| Effective Number of Misses Leading to Stalls | #Misses = (STALL_FE_MEM + STALL_BACKEND_MEM)/AVG_BUS_ACCESS_LATENCY |
| Miss Cycles | Miss Cycles = STALL_BACKEND_MEM + STALL_FE_MEM |
| Average Clock Cycles per Hit Instruction (CPI_hit), where C0 Cycles indicates a count of cycles in which core is in C0 power state (obtained from AMU) | CPI_hit = (C0 Cycles − Miss Cycles)/INSTR_RETIRED |
| Misses per Instruction (MPI) | MPI = #Misses/IC |
| Miss Cycles per Miss (MCPM) | MCPM = Miss Cycles/# Misses |
| Effective Frequency of Core, where XO_FREQ indicates a frequency generated by a crystal oscillator | F_eff = (CPU_CYCLES/CNT_CYCLES) * XO_FREQ |
| Average Clock Cycles per Instruction (CPI) at frequency = f | CPI(f) = CPI_hit + MPI * (MCPM * f/F_eff) |
| Average Instructions per Clock Cycle (IPC) at frequency = f | IPC(f) = 1/CPI(f) |

After calculating the IPCs for each of the frequency operating points 206(0)-206(F), the cluster power management circuit 124 may calculate the performance values 204(0)-204(F) using the equation Perf (f)=IPC(f)*f, where f equals the frequency at each of the frequency operating points 206(0)-206(F). Thus, each of the performance values 204(0)-204(F) comprises a product of the corresponding frequency operating point 206(0)-206(F) multiplied by an average number of instructions per clock cycle at the frequency operating point 206(0)-206(F).

Figure 3:
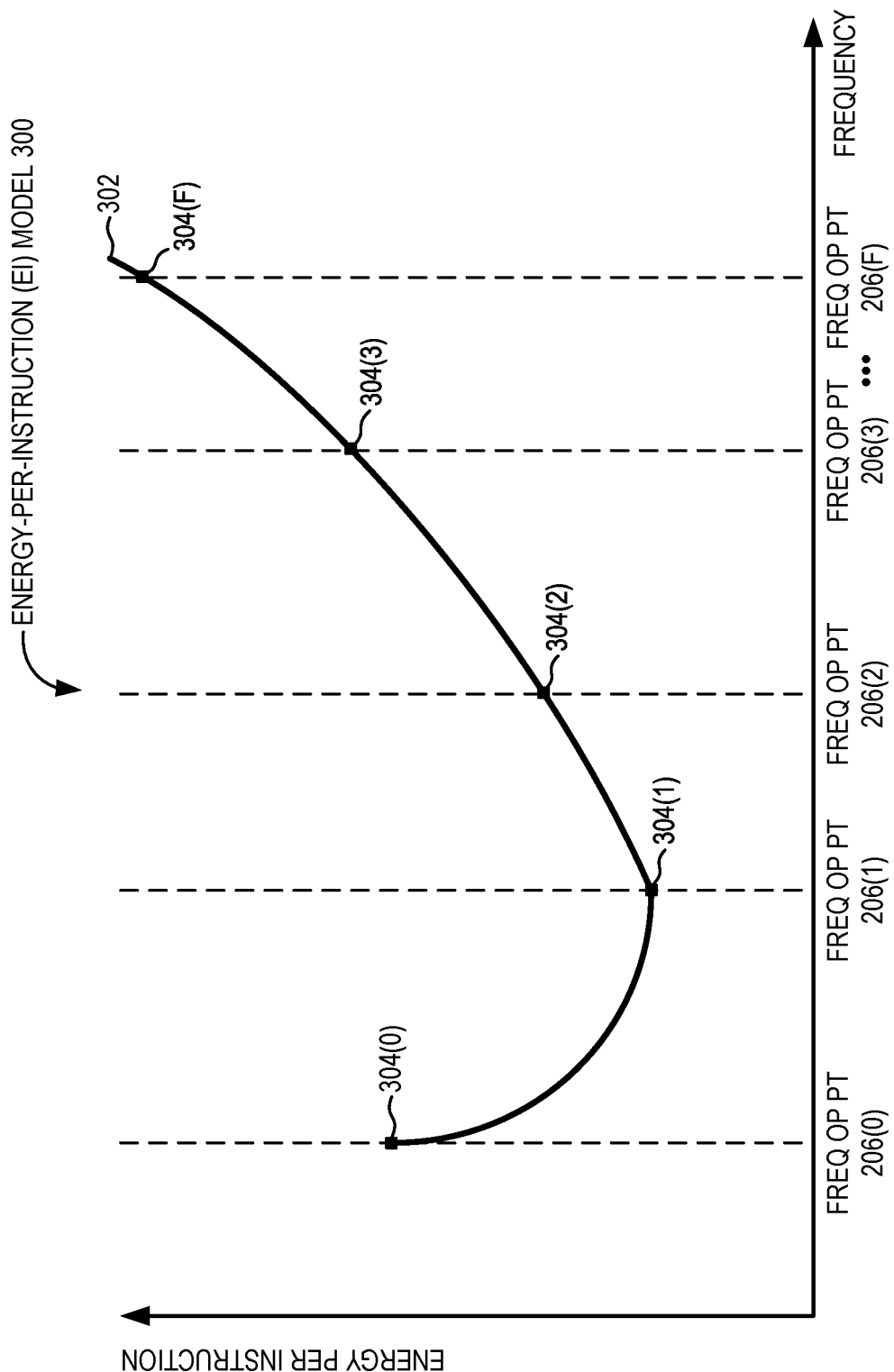
FIG. 3 is a diagram illustrating an exemplary energy-per-instruction (EI) model generated by the cluster power management circuit of FIG. 1 based on the performance model of FIG. 2, according to some aspects.

FIG. 3 illustrates an exemplary EI model 300 that may be generated by the cluster power management circuit 124 of FIG. 1 to represent energy per instruction as a function of frequency, based on the performance model 200 of FIG. 2 and the power consumption measurement 130 of FIG. 1 (where the power consumption measurement 130 indicates power consumed at the frequency and voltage used at a given frequency operating point). As seen in FIG. 3, the EI model 300 comprises a curve 302 that is generated to fit a plurality of EI values 304(0)-304(F) that are calculated by the cluster power management circuit 124 for each of the frequency operating points (captioned as "FREQ OP PT" in FIG. 3) 206(0)-206(F) of FIG. 2 during the time interval. The frequency operating points 206(0)-206(F) are illustrated in FIG. 3 by vertical dotted lines arranged along a horizontal frequency axis, while the EI values 304(0)-304(F) are illustrated as points on each vertical dotted line along a vertical energy-per-instruction axis.

The cluster power management circuit 124 generates the EI model 300 by calculating the EI values 304(0)-304(F) using the equation $$EI = \frac{\text{Power }(V, f)}{\text{Perf}(f)}.$$

Power (V, f) corresponds to the power consumption measurement 130 of power consumption at a voltage V and a frequency f of each frequency operating point 206(0)-206(F), while Perf (f) corresponds to one of the performance values 204(0)-204(F) at the frequency f of each frequency operating point 206(0)-206(F). Accordingly, each of the EI values 304(0)-304(F) comprises a quotient of power consumption at the corresponding frequency operating point 206(0)-206(F) divided by the performance value 204(0)-204(F) for the corresponding frequency operating point 206(0)-206(F).

Figure 4:
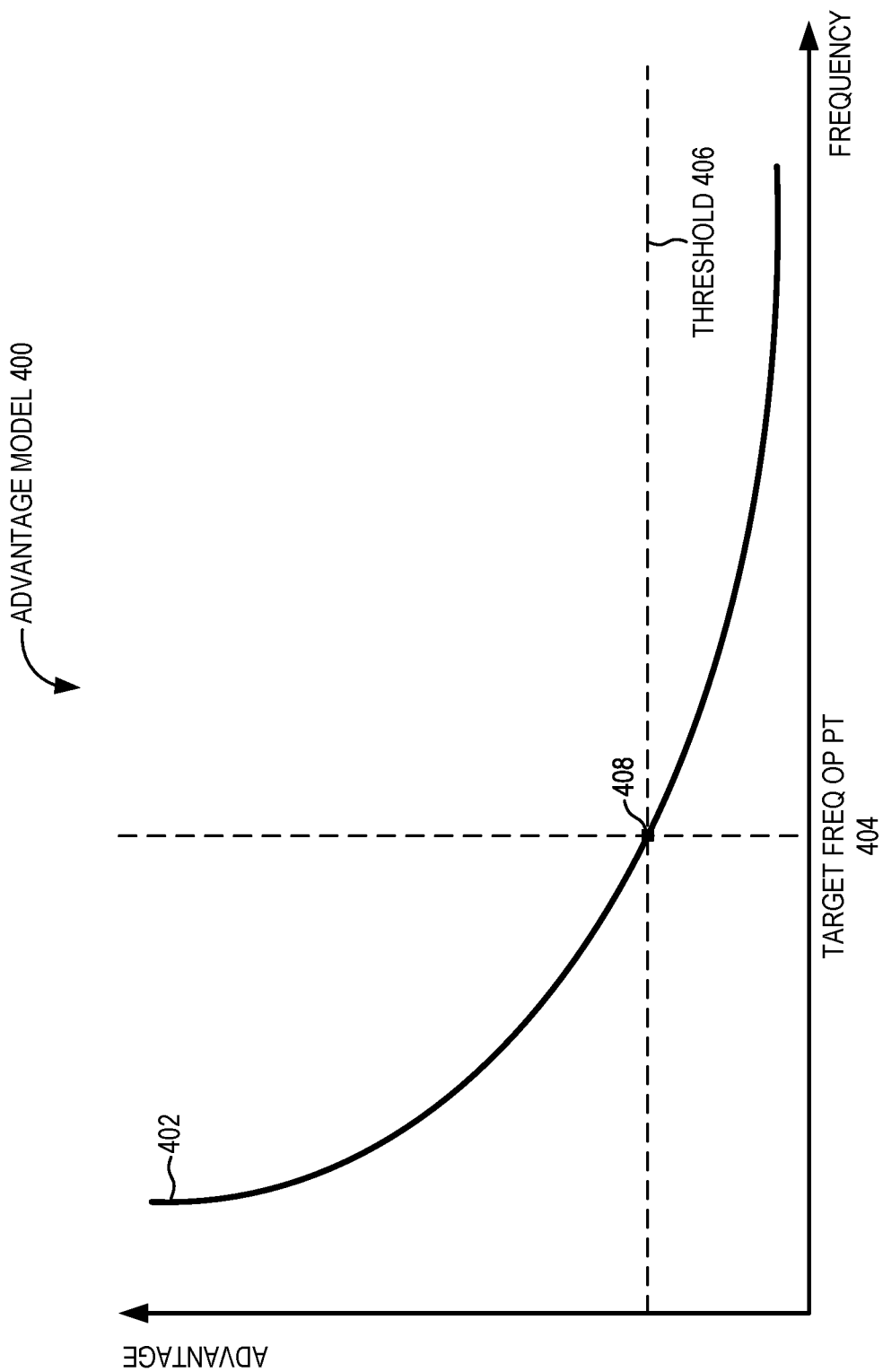
FIG. 4 is a diagram illustrating an exemplary advantage model generated by the cluster power management circuit of FIG. 1 based on the performance model of FIG. 2 and the EI model of FIG. 3, according to some aspects.

FIG. 4 shows an exemplary advantage model 400 that may be generated by the cluster power management circuit 124 of FIG. 1 using the performance model 200 of FIG. 2 and the EI model 300 of FIG. 3. The advantage model 400 comprises a curve 402 that is based on a first rate of change of the performance model 200 as a function of frequency and a second rate of change of the EI model 300 as a function of frequency. The advantage model 400 may be calculated by the cluster power management circuit 124 using the equation $$\text{Advantage} = \frac{\partial(\text{Perf})}{\partial(EI)} \frac{\frac{d(\text{Perf})}{df}}{\frac{d(EI)}{df}}.$$

Thus, in some aspects, the advantage model 400 involves the cluster power management circuit 124 calculating a quotient of the first rate of change of the performance model 200 as a function of frequency divided by the second rate of change of the EI model 300 as a function of frequency.

Using the advantage model 400, the cluster power management circuit 124 identifies a target frequency operating point (captioned as "TARGET FREQ OP PT" in FIG. 4) 404. The target frequency operating point 404 represents a frequency where the gain in normalized performance for the corresponding increase in energy per instruction is acceptable for a given QoS hint provided by an OS. The acceptable advantage level for the given QoS hint is indicated by a threshold 406. The target frequency operating point 404 thus may be calculated as a maximum frequency operating point that corresponds to an advantage value 408 that is indicated by the advantage model 400 as being greater than or equal to the threshold 406. It is to be understood that, while only one threshold 406 is shown in FIG. 4, some aspects may provide multiple thresholds 406, each corresponding to a different QoS hint and indicating a different advantage level appropriate for that QoS hint. The target frequency operating point 404 is illustrated in FIG. 4 by a vertical dotted line arranged along a horizontal frequency axis, while the advantage value 408 is illustrated as a point on the vertical dotted line along a vertical advantage axis.

Some aspects may further provide that the OS also provides an EPP hint (e.g., a value from 0 to 15, as a non-limiting example) to indicate whether the OS or application software prefers to bias towards performance or energy efficiency. In such aspects, the cluster power management circuit 124 may calculate a target frequency operating point F_EB corresponding to an energy-balanced point using a first threshold, and also calculate a target frequency operating point F_PERF corresponding to a performance point using a second threshold. The cluster power management circuit 124 then calculates the frequency for the core cluster 102(0) using the logic shown in Table 3 below:

TABLE 3

| EPP Hint Value | Logic Applied | Frequency Chosen |
| --- | --- | --- |
| 8 | Select F_EB | F_EB |
| 0-7 | Divide region between energy efficient frequency F_E and F_EB into 8 intervals [f_i, f_i + 1] for i = {0, 1, . . . , 7}, where f_0 = F_E and f_7 = F_EB | F_{EPP} |
| 9-15 | Divide region between F_EB and F_PERF into 7 intervals [f_j, f_j + 1] for i = {9, 10, . . . , 15}, where f_10 = F_EB and f_6 = F_PERF | F_{EPP + 1} |

Figure 5A:
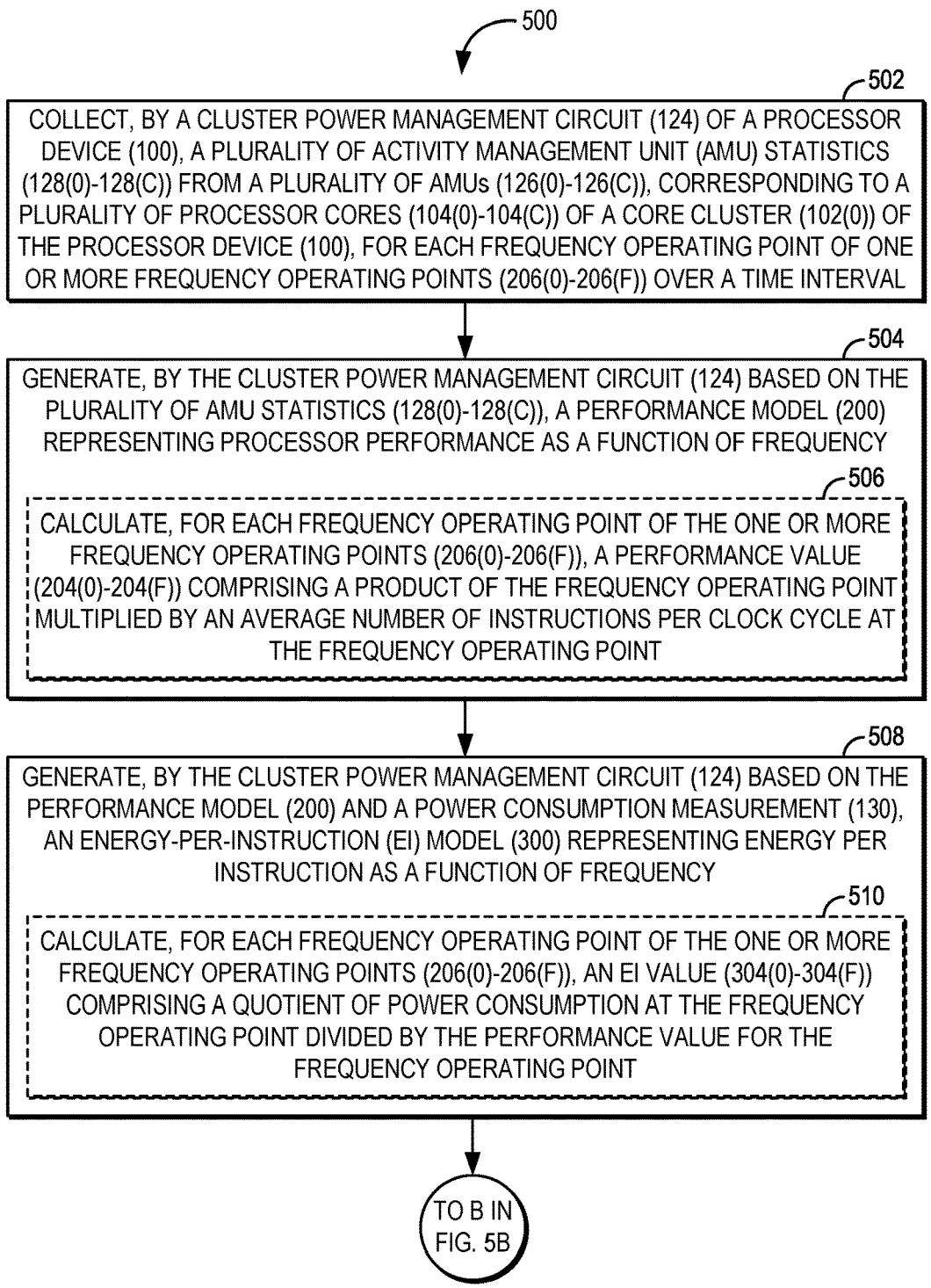
FIGS. 5A-5C provide a flowchart illustrating exemplary operations performed by the processor device of FIG. 1 for autonomously managing core cluster frequencies using performance statistics, according to some aspects.
Figure 5B:
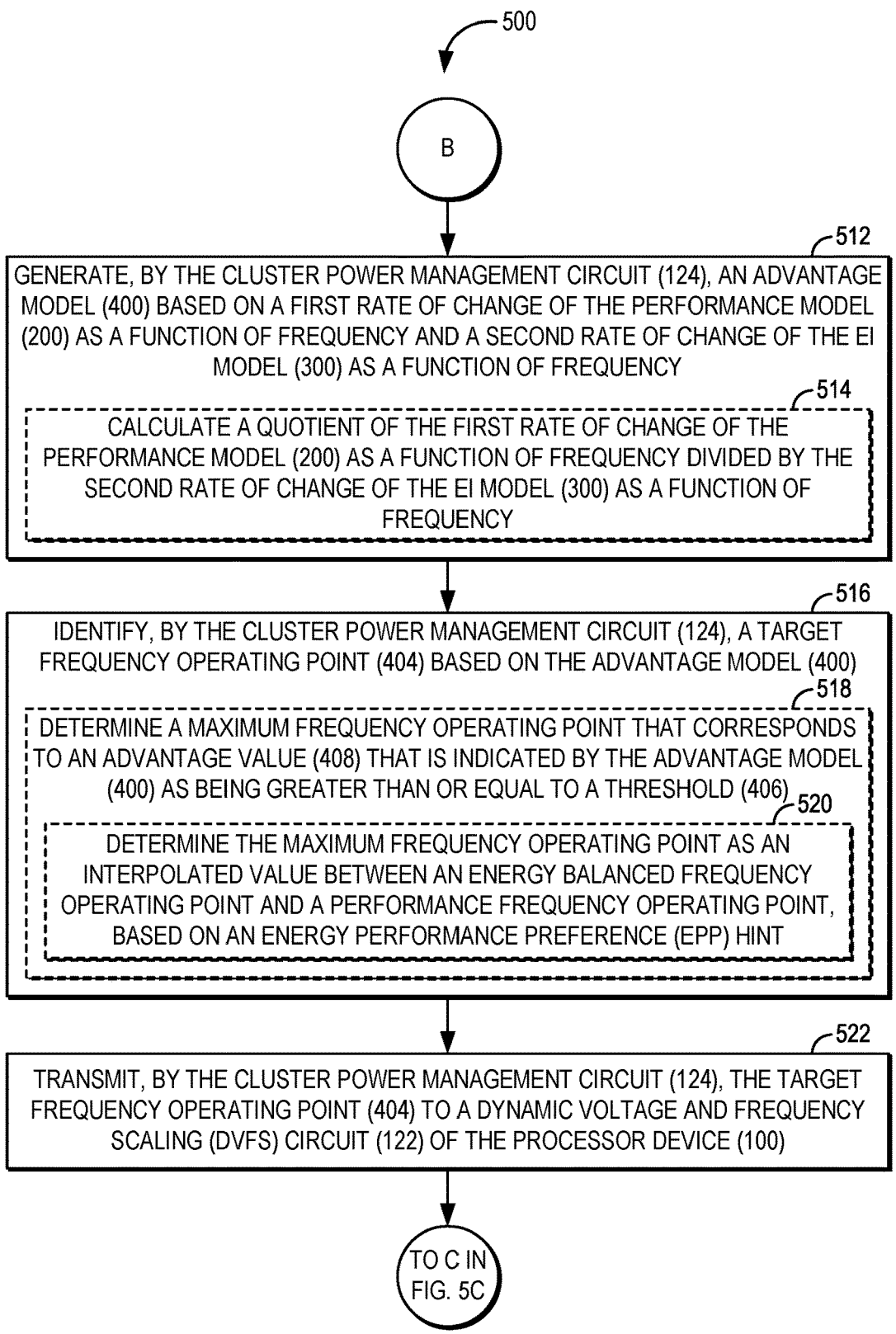
Figure 5C:
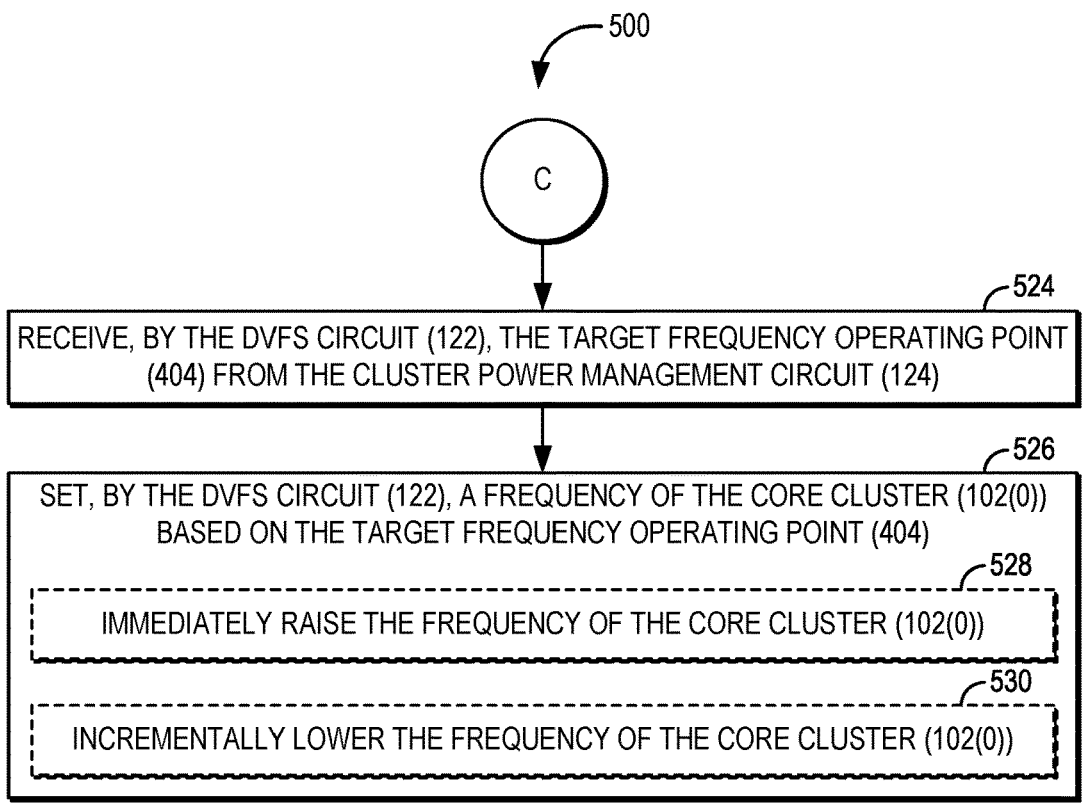

To illustrate exemplary operations performed by the processor device 100 of FIG. 1 for autonomously managing core cluster frequencies using performance statistics according to some aspects, FIGS. 5A-5C provide a flowchart illustrating exemplary operations 500. For the sake of clarity, elements of FIGS. 1-4 are referenced in describing FIGS. 5A-5C. It is to be understood that, in some aspects, some of the exemplary operations 500 may be performed in an order other than that illustrated herein, and/or may be omitted.

The exemplary operations 500 begin in FIG. 5A with a cluster power management circuit of a processor device (e.g., the cluster power management circuit 124 of the processor device 100 of FIG. 1) collecting a plurality of AMU statistics from a plurality of AMUs (such as the AMU statistics 128(0)-128(C) from the AMUs 126(0)-126(C) of FIG. 1), corresponding to a plurality of processor cores of a core cluster (e.g., the processor cores 104(0)-104(C) of the core cluster 102(0) of FIG. 1) of the processor device 100, for each frequency operating point of one or more frequency operating points (such as the frequency operating points 206(0)-206(F) of FIGS. 2 and 3) over a time interval (block 502). The cluster power management circuit 124 generates, based on the plurality of AMU statistics 128(0)-128(C), a performance model (e.g., the performance model 200 of FIG. 2) representing processor performance as a function of frequency (block 504). In some aspects, the operations of block 504 for generating the performance model 200 may comprise calculating, for each frequency operating point of the one or more frequency operating points 206(0)-206(F), a performance value (such as the performance values 204(0)-204(F) of FIG. 2) comprising a product of the frequency operating point multiplied by an average number of instructions per clock cycle at the frequency operating point (block 506).

The cluster power management circuit 124 also generates, based on the performance model 200 and a power consumption measurement (such as the power consumption measurement 130 of FIG. 1), an EI model (e.g., the EI model 300 of FIG. 3) representing energy per instruction as a function of frequency (block 508). Some aspects may provide that the operations of block 508 for generating the EI model 300 comprise calculating, for each frequency operating point of the one or more frequency operating points 206(0)-206(F), an EI value (such as the EI values 304(0)-304(F) of FIG. 3) comprising a quotient of power consumption at the frequency operating point divided by the performance value for the frequency operating point (block 510). The exemplary operations 500 continue at block 512 of FIG. 5B.

Referring now to FIG. 5B, the cluster power management circuit 124 next generates an advantage model (e.g., the advantage model 400 of FIG. 4) based on a first rate of change of the performance model 200 as a function of frequency and a second rate of change of the EI model 300 as a function of frequency (block 512). According to some aspects, the operations of block 512 for generating the advantage model 400 comprise calculating a quotient of the first rate of change of the performance model 200 as a function of frequency divided by the second rate of change of the EI model 300 as a function of frequency (block 514).

The cluster power management circuit 124 then identifies a target frequency operating point (such as the target frequency operating point 404 of FIG. 4) based on the advantage model 400 (block 516). In some aspects, the operations of block 516 for identifying the target frequency operating point 404 may comprise determining a maximum frequency operating point that corresponds to an advantage value (e.g., the advantage value 408 of FIG. 4) that is indicated by the advantage model 400 as being greater than or equal to a threshold (e.g., the threshold 406 of FIG. 4) (block 518). Some such aspects may provide that the operations of block 518 for determining the maximum frequency operating point comprise determining the maximum frequency operating point as an interpolated value between an energy balanced frequency operating point (i.e., a frequency operating point selected to balance power consumption and processor performance) and a performance frequency operating point (i.e., a frequency operating point selected to prioritize processor performance), based on an EPP hint (block 520). After identifying the target frequency operating point 404, the cluster power management circuit 124 transmits the target frequency operating point 404 to a DVFS circuit (such as the DVFS circuit 122 of FIG. 1) of the processor device 100 (block 522). The exemplary operations 500 in some aspects may continue at block 524 of FIG. 5C.

Turning now to FIG. 5C, in some aspects, the DVFS circuit 122 receives the target frequency operating point 404 from the cluster power management circuit 124 (block 524). The DVFS circuit 122 then sets a frequency of the core cluster 102(0) based on the target frequency operating point 404 (block 526). According to some aspects in which the target frequency operating point 404 is higher than a current frequency of the core cluster 102(0), the operations of block 526 for setting the frequency of the core cluster 102(0) may comprise immediately raising the frequency of the core cluster 102(0) (block 528). Some aspects in which the target frequency operating point 404 is lower than the current frequency of the core cluster 102(0) may provide that the operations of block 526 for setting the frequency of the core cluster 102(0) comprise incrementally lowering the frequency of the core cluster 102(0) (block 530).

The processor device according to aspects disclosed herein and discussed with reference to FIG. 1 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
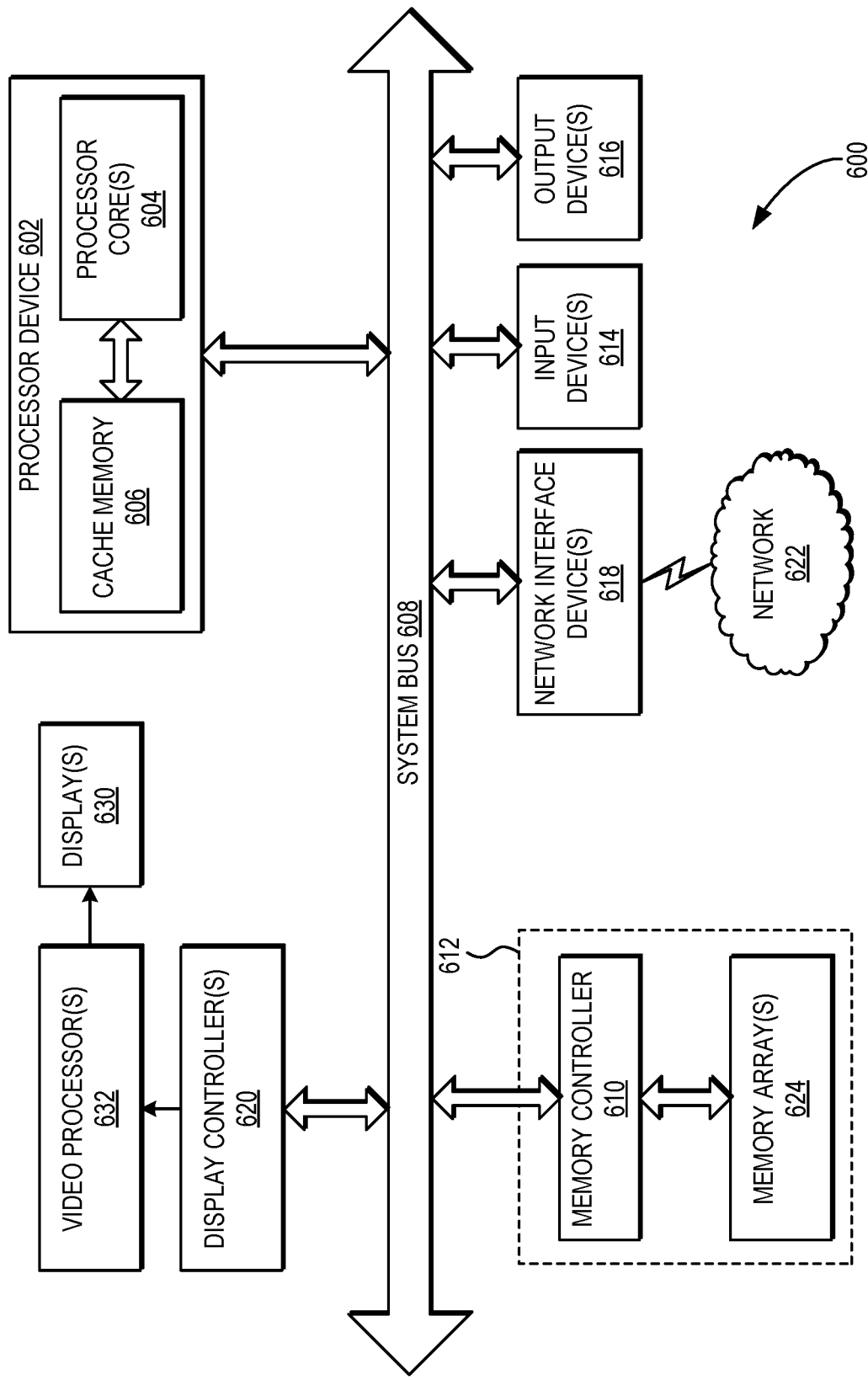
FIG. 6 is a block diagram of an exemplary processor-based device that can include the processor device of FIG. 1.

In this regard, FIG. 6 illustrates an example of a processor-based device 600 as illustrated and described with respect to FIG. 1. In this example, the processor-based device 600 includes a processor device 602, which corresponds in functionality to the processor device 100 of FIG. 1 and comprises one or more processor cores 604 coupled to a cache memory 606. The processor core(s) 604 is also coupled to a system bus 608 and can intercouple devices included in the processor-based device 600. As is well known, the processor core(s) 604 communicates with these other devices by exchanging address, control, and data information over the system bus 608. For example, the processor core(s) 604 can communicate bus transaction requests to a memory controller 610. Although not illustrated in FIG. 6, multiple system buses 608 could be provided, wherein each system bus 608 constitutes a different fabric.

Other devices may be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include the memory controller 610 coupled to one or more memory arrays 624. The display controller(s) may comprise, e.g., the GPU 106 of FIG. 1.

The processor core(s) 604 may also be configured to access the display controller(s) 620 over the system bus 608 to control information sent to one or more displays 630. The display controller(s) 620 sends information to the display(s) 630 to be displayed via one or more video processors 632, which process the information to be displayed into a format suitable for the display(s) 630. The display(s) 630 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor device comprising:
    a core cluster comprising:
        a plurality of processor cores comprising a corresponding plurality of Activity Management Units (AMUs);
        a cluster power management circuit; and
        a dynamic voltage and frequency scaling (DVFS) circuit; and
    the cluster power management circuit configured to:
        collect a plurality of AMU statistics from the plurality of AMUs for each frequency operating point of one or more frequency operating points over a time interval;
        generate, based on the plurality of AMU statistics, a performance model representing processor performance as a function of frequency;
        generate, based on the performance model and a power consumption measurement, an energy-per-instruction (EI) model representing energy per instruction as a function of frequency;
        generate an advantage model based on a first rate of change of the performance model as a function of frequency and a second rate of change of the EI model as a function of frequency;
        identify a target frequency operating point based on the advantage model; and
        transmit the target frequency operating point to the DVFS circuit.
2. The processor device of clause 1, wherein the DVFS circuit is configured to:
    receive the target frequency operating point from the cluster power management circuit; and
    set a frequency of the core cluster based on the target frequency operating point.
3. The processor device of clause 2, wherein:
    the target frequency operating point is higher than a current frequency of the core cluster; and
    the DVFS circuit is configured to set the frequency of the core cluster based on the target frequency operating point by being configured to immediately raise the frequency of the core cluster.
4. The processor device of clause 2, wherein:
    the target frequency operating point is lower than a current frequency of the core cluster; and
    the DVFS circuit is configured to set the frequency of the core cluster based on the target frequency operating point by being configured to incrementally lower the frequency of the core cluster.
5. The processor device of any one of clauses 1-4, wherein the time interval comprises a programmable time interval.
6. The processor device of any one of clauses 1-5, wherein the plurality of AMU statistics comprises one or more of a count of processor frequency cycles, a count of constant frequency cycles, a count of instructions retired, a count of front-end stalls, a count of memory stall cycles, a count of total demand misses of a last level cache (LLC), a count of front-end stalls that are memory-bound, a count of LLC demand accesses, a count of bus accesses, a count of bus access cycles, and a count of speculatively executed instructions.
7. The processor device of any one of clauses 1-6, wherein the cluster power management circuit is configured to generate the performance model by being configured to calculate, for each frequency operating point of the one or more frequency operating points, a performance value comprising a product of the frequency operating point multiplied by an average number of instructions per clock cycle at the frequency operating point.
8. The processor device of any one of clauses 1-7, wherein the cluster power management circuit is configured to generate the EI model by being configured to calculate, for each frequency operating point of the one or more frequency operating points, an EI value comprising a quotient of power consumption at the frequency operating point divided by a performance value for the frequency operating point.
9. The processor device of any one of clauses 1-8, wherein the cluster power management circuit is configured to generate the advantage model by being configured to calculate the first rate of change of the performance model as a function of frequency divided by the second rate of change of the EI model as a function of frequency.
10. The processor device of any one of clauses 1-9, wherein the cluster power management circuit is configured to identify the target frequency operating point based on the advantage model by being configured to determine a maximum frequency operating point that corresponds to an advantage value that is indicated by the advantage model as being greater than or equal to a threshold.
11. The processor device of clause 10, wherein the threshold corresponds to a Quality of Service (QOS) hint provided by an operating system (OS) executed by the processor device.
12. The processor device of any one of clauses 10-11, wherein the cluster power management circuit is configured to determine the maximum frequency operating point by being configured to determine the maximum frequency operating point as an interpolated value between an energy balanced frequency operating point and a performance frequency operating point, based on an energy performance preference (EPP) hint.

13. The processor device of any one of clauses 1-12, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

14. A processor device, comprising:
   means for collecting a plurality of Activity Management Unit (AMU) statistics from a plurality of AMUs, corresponding to a plurality of processor cores of a core cluster of the processor device, for each frequency operating point of one or more frequency operating points over a time interval;
   means for generating, based on the plurality of AMU statistics, a performance model representing processor performance as a function of frequency;
   means for generating, based on the performance model and a power consumption measurement, an energy-per-instruction (EI) model representing energy per instruction as a function of frequency;
   means for generating an advantage model based on a first rate of change of the performance model as a function of frequency and a second rate of change of the EI model as a function of frequency;
   means for identifying a target frequency operating point based on the advantage model; and
   means for transmitting the target frequency operating point to a dynamic voltage and frequency scaling (DVFS) circuit of the processor device.

15. A method for autonomously managing core cluster frequencies in processor-based devices, comprising:
   collecting, by a cluster power management circuit of a processor device, a plurality of Activity Management Units (AMU) statistics from a plurality of AMUs, corresponding to a plurality of processor cores of a core cluster of the processor device, for each frequency operating point of one or more frequency operating points over a time interval;
   generating, by the cluster power management circuit based on the plurality of AMU statistics, a performance model representing processor performance as a function of frequency;
   generating, by the cluster power management circuit based on the performance model and a power consumption measurement, an energy-per-instruction (EI) model representing energy per instruction as a function of frequency;
   generating, by the cluster power management circuit, an advantage model based on a first rate of change of the performance model as a function of frequency and a second rate of change of the EI model as a function of frequency;
   identifying, by the cluster power management circuit, a target frequency operating point based on the advantage model; and
   transmitting, by the cluster power management circuit, the target frequency operating point to a dynamic voltage and frequency scaling (DVFS) circuit of the processor device.

16. The method of clause 15, further comprising:
   receiving, by the DVFS circuit, the target frequency operating point from the cluster power management circuit; and
   setting, by the DVFS circuit, a frequency of the core cluster based on the target frequency operating point.

17. The method of clause 16, wherein:
   the target frequency operating point is higher than a current frequency of the core cluster; and
   setting the frequency of the core cluster based on the target frequency operating point comprises immediately raising the frequency of the core cluster.

18. The method of clause 16, wherein:
   the target frequency operating point is lower than a current frequency of the core cluster; and
   setting the frequency of the core cluster based on the target frequency operating point comprises incrementally lowering the frequency of the core cluster.

19. The method of any one of clauses 15-18, wherein the time interval comprises a programmable time interval.

20. The method of any one of clauses 15-19, wherein the plurality of AMU statistics comprises one or more of a count of processor frequency cycles, a count of constant frequency cycles, a count of instructions retired, a count of front-end stalls, a count of memory stall cycles, a count of total demand misses of a last level cache (LLC), a count of front-end stalls that are memory-bound, a count of LLC demand accesses, a count of bus accesses, a count of bus access cycles, and a count of speculatively executed instructions.

21. The method of any one of clauses 15-20, wherein generating the performance model comprises calculating, for each frequency operating point of the one or more frequency operating points, a performance value comprising a product of the frequency operating point multiplied by an average number of instructions per clock cycle at the frequency operating point.

22. The method of any one of clauses 15-21, wherein generating the EI model comprises calculating, for each frequency operating point of the one or more frequency operating points, an EI value comprising a quotient of power consumption at the frequency operating point divided by a performance value for the frequency operating point.

23. The method of any one of clauses 15-22, wherein generating the advantage model comprises calculating the first rate of change of the performance model as a function of frequency divided by the second rate of change of the EI model as a function of frequency.

24. The method of any one of clauses 15-23, wherein identifying the target frequency operating point based on the advantage model comprises determining a maximum frequency operating point that corresponds to an advantage value that is indicated by the advantage model as being greater than or equal to a threshold.

25. The method of clause 24, wherein the threshold corresponds to a Quality of Service (QOS) hint provided by an operating system (OS) executed by the processor device.

26. The method of any one of clauses 24-25, wherein determining the maximum frequency operating point comprises determining the maximum frequency operating point as an interpolated value between an energy balanced frequency operating point and a performance frequency operating point, based on an energy performance preference (EPP) hint.

27. A non-transitory computer-readable medium, having stored thereon computer-executable instructions that, when executed, cause a processor device of a processor-based device to:
collect a plurality of Activity Management Units (AMU) statistics from a plurality of AMUs, corresponding to a plurality of processor cores of a core cluster of the processor device, for each frequency operating point of one or more frequency operating points over a time interval;
generate, based on the plurality of AMU statistics, a performance model representing processor performance as a function of frequency;
generate, based on the performance model and a power consumption measurement, an energy-per-instruction (EI) model representing energy per instruction as a function of frequency;
generate an advantage model based on a first rate of change of the performance model as a function of frequency and a second rate of change of the EI model as a function of frequency;
identify a target frequency operating point based on the advantage model; and
transmit the target frequency operating point to a dynamic voltage and frequency scaling (DVFS) circuit of the processor device.

28. The non-transitory computer-readable medium of clause 27, wherein the computer-executable instructions further cause the processor device to:
receive the target frequency operating point; and
set a frequency of the core cluster based on the target frequency operating point.

29 The non-transitory computer-readable medium of clause 28, wherein:
the target frequency operating point is higher than a current frequency of the core cluster; and
the computer-executable instructions cause the processor device to set the frequency of the core cluster based on the target frequency operating point by causing the processor device to immediately raise the frequency of the core cluster.

30. The non-transitory computer-readable medium of clause 28, wherein:
the target frequency operating point is lower than a current frequency of the core cluster; and
the computer-executable instructions cause the processor device to set the frequency of the core cluster based on the target frequency operating point by causing the processor device to incrementally lower the frequency of the core cluster.

31. The non-transitory computer-readable medium of any one of clauses 27-30, wherein the time interval comprises a programmable time interval.

32. The non-transitory computer-readable medium of any one of clauses 27-31, wherein the plurality of AMU statistics comprises one or more of a count of processor frequency cycles, a count of constant frequency cycles, a count of instructions retired, a count of front-end stalls, a count of memory stall cycles, a count of total demand misses of a last level cache (LLC), a count of front-end stalls that are memory-bound, a count of LLC demand accesses, a count of bus accesses, a count of bus access cycles, and a count of speculatively executed instructions.

33. The non-transitory computer-readable medium of any one of clauses 27-32, wherein the computer-executable instructions cause the processor device to generate the performance model by causing the processor device to calculate, for each frequency operating point of the one or more frequency operating points, a performance value comprising a product of the frequency operating point multiplied by an average number of instructions per clock cycle at the frequency operating point.

34. The non-transitory computer-readable medium of any one of clauses 27-33, wherein the computer-executable instructions cause the processor device to generate the EI model by causing the processor device to calculate, for each frequency operating point of the one or more frequency operating points, an EI value comprising a quotient of power consumption at the frequency operating point divided by a performance value for the frequency operating point.

35. The non-transitory computer-readable medium of any one of clauses 27-34, wherein the computer-executable instructions cause the processor device to generate the advantage model by causing the processor device to calculate the first rate of change of the performance model as a function of frequency divided by the second rate of change of the EI model as a function of frequency.

36. The non-transitory computer-readable medium of any one of clauses 27-35, wherein the computer-executable instructions cause the processor device to identify the target frequency operating point based on the advantage model by causing the processor device to determine a maximum frequency operating point that corresponds to an advantage value that is indicated by the advantage model as being greater than or equal to a threshold.

37. The non-transitory computer-readable medium of clause 36, wherein the threshold corresponds to a Quality of Service (QOS) hint provided by an operating system (OS) executed by the processor device.

38. The non-transitory computer-readable medium of any one of clauses 36-37, wherein the computer-executable instructions cause the processor device to determine the maximum frequency operating point by causing the processor device to determine the maximum frequency operating point as an interpolated value between an energy balanced frequency operating point and a performance frequency operating point, based on an energy performance preference (EPP) hint.

What is claimed is:
1. A processor device comprising:
a core cluster comprising:
a plurality of processor cores comprising a corresponding plurality of Activity Management Units (AMUs);
a cluster power management circuit; and
a dynamic voltage and frequency scaling (DVFS) circuit; and
the cluster power management circuit configured to:
collect a plurality of AMU statistics from the plurality of AMUs for each frequency operating point of one or more frequency operating points over a time interval;

generate, based on the plurality of AMU statistics, a performance model representing processor performance as a function of frequency;
generate, based on the performance model and a power consumption measurement, an energy-per-instruction (EI) model representing energy per instruction as a function of frequency;
generate an advantage model based on a first rate of change of the performance model as a function of frequency and a second rate of change of the EI model as a function of frequency;
identify a target frequency operating point based on the advantage model; and
transmit the target frequency operating point to the DVFS circuit,
wherein the DVFS circuit is configured to:
receive the target frequency operating point from the cluster power management circuit; and
set a frequency of the core cluster based on the target frequency operating point.

2. The processor device of claim 1, wherein:
the target frequency operating point is higher than a current frequency of the core cluster; and
the DVFS circuit is configured to set the frequency of the core cluster based on the target frequency operating point by being configured to immediately raise the frequency of the core cluster.

3. The processor device of claim 1, wherein:
the target frequency operating point is lower than a current frequency of the core cluster; and
the DVFS circuit is configured to set the frequency of the core cluster based on the target frequency operating point by being configured to incrementally lower the frequency of the core cluster.

4. The processor device of claim 1, wherein the time interval comprises a programmable time interval.

5. The processor device of claim 1, wherein the plurality of AMU statistics comprises one or more of a count of processor frequency cycles, a count of constant frequency cycles, a count of instructions retired, a count of front-end stalls, a count of memory stall cycles, a count of total demand misses of a last level cache (LLC), a count of front-end stalls that are memory-bound, a count of LLC demand accesses, a count of bus accesses, a count of bus access cycles, and a count of speculatively executed instructions.

6. The processor device of claim 1, wherein the cluster power management circuit is configured to generate the performance model by being configured to calculate, for each frequency operating point of the one or more frequency operating points, a performance value comprising a product of the frequency operating point multiplied by an average number of instructions per clock cycle at the frequency operating point.

7. The processor device of claim 1, wherein the cluster power management circuit is configured to generate the EI model by being configured to calculate, for each frequency operating point of the one or more frequency operating points, an EI value comprising a quotient of power consumption at the frequency operating point divided by a performance value for the frequency operating point.

8. The processor device of claim 1, wherein the cluster power management circuit is configured to generate the advantage model by being configured to calculate the first rate of change of the performance model as a function of frequency divided by the second rate of change of the EI model as a function of frequency.

9. The processor device of claim 1, wherein the cluster power management circuit is configured to identify the target frequency operating point based on the advantage model by being configured to determine a maximum frequency operating point that corresponds to an advantage value that is indicated by the advantage model as being greater than or equal to a threshold.

10. The processor device of claim 9, wherein the threshold corresponds to a Quality of Service (QOS) hint provided by an operating system (OS) executed by the processor device.

11. The processor device of claim 9, wherein the cluster power management circuit is configured to determine the maximum frequency operating point by being configured to determine the maximum frequency operating point as an interpolated value between an energy balanced frequency operating point and a performance frequency operating point, based on an energy performance preference (EPP) hint.

12. The processor device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

13. A method for autonomously managing core cluster frequencies in processor-based devices, comprising:
collecting, by a cluster power management circuit of a processor device, a plurality of Activity Management Units (AMU) statistics from a plurality of AMUs, corresponding to a plurality of processor cores of a core cluster of the processor device, for each frequency operating point of one or more frequency operating points over a time interval;
generating, by the cluster power management circuit based on the plurality of AMU statistics, a performance model representing processor performance as a function of frequency;
generating, by the cluster power management circuit based on the performance model and a power consumption measurement, an energy-per-instruction (EI) model representing energy per instruction as a function of frequency;
generating, by the cluster power management circuit, an advantage model based on a first rate of change of the performance model as a function of frequency and a second rate of change of the EI model as a function of frequency;
identifying, by the cluster power management circuit, a target frequency operating point based on the advantage model;
transmitting, by the cluster power management circuit, the target frequency operating point to a dynamic voltage and frequency scaling (DVFS) circuit of the processor device;
receiving, by the DVFS circuit, the target frequency operating point from the cluster power management circuit; and setting, by the DVFS circuit, a frequency of the core cluster based on the target frequency operating point.

14. The method of claim 13, wherein:
the target frequency operating point is higher than a current frequency of the core cluster; and
setting the frequency of the core cluster based on the target frequency operating point comprises immediately raising the frequency of the core cluster.

15. The method of claim 13, wherein:
the target frequency operating point is lower than a current frequency of the core cluster; and
setting the frequency of the core cluster based on the target frequency operating point comprises incrementally lowering the frequency of the core cluster.

16. The method of claim 13, wherein the time interval comprises a programmable time interval.

17. The method of claim 13, wherein the plurality of AMU statistics comprises one or more of a count of processor frequency cycles, a count of constant frequency cycles, a count of instructions retired, a count of front-end stalls, a count of memory stall cycles, a count of total demand misses of a last level cache (LLC), a count of front-end stalls that are memory-bound, a count of LLC demand accesses, a count of bus accesses, a count of bus access cycles, and a count of speculatively executed instructions.

18. The method of claim 13, wherein generating the performance model comprises calculating, for each frequency operating point of the one or more frequency operating points, a performance value comprising a product of the frequency operating point multiplied by an average number of instructions per clock cycle at the frequency operating point.

19. The method of claim 13, wherein generating the EI model comprises calculating, for each frequency operating point of the one or more frequency operating points, an EI value comprising a quotient of power consumption at the frequency operating point divided by a performance value for the frequency operating point.

20. The method of claim 13, wherein generating the advantage model comprises calculating the first rate of change of the performance model as a function of frequency divided by the second rate of change of the EI model as a function of frequency.

21. The method of claim 13, wherein identifying the target frequency operating point based on the advantage model comprises determining a maximum frequency operating point that corresponds to an advantage value that is indicated by the advantage model as being greater than or equal to a threshold.

22. The method of claim 21, wherein the threshold corresponds to a Quality of Service (QOS) hint provided by an operating system (OS) executed by the processor device.

23. The method of claim 21, wherein determining the maximum frequency operating point comprises determining the maximum frequency operating point as an interpolated value between an energy balanced frequency operating point and a performance frequency operating point, based on an energy performance preference (EPP) hint.

24. A non-transitory computer-readable medium, having stored thereon computer-executable instructions that, when executed, cause a processor device of a processor-based device to:
collect a plurality of Activity Management Units (AMU) statistics from a plurality of AMUs, corresponding to a plurality of processor cores of a core cluster of the processor device, for each frequency operating point of one or more frequency operating points over a time interval;
generate, based on the plurality of AMU statistics, a performance model representing processor performance as a function of frequency;
generate, based on the performance model and a power consumption measurement, an energy-per-instruction (EI) model representing energy per instruction as a function of frequency;
generate an advantage model based on a first rate of change of the performance model as a function of frequency and a second rate of change of the EI model as a function of frequency;
identify a target frequency operating point based on the advantage model;
transmit the target frequency operating point to a dynamic voltage and frequency scaling (DVFS) circuit of the processor device;
receive the target frequency operating point; and
set a frequency of the core cluster based on the target frequency operating point.

25. The non-transitory computer-readable medium of claim 24, wherein:
the target frequency operating point is higher than a current frequency of the core cluster; and
the computer-executable instructions cause the processor device to set the frequency of the core cluster based on the target frequency operating point by causing the processor device to immediately raise the frequency of the core cluster.

26. The non-transitory computer-readable medium of claim 24, wherein:
the target frequency operating point is lower than a current frequency of the core cluster; and
the computer-executable instructions cause the processor device to set the frequency of the core cluster based on the target frequency operating point by causing the processor device to incrementally lower the frequency of the core cluster.

27. The non-transitory computer-readable medium of claim 24, wherein the time interval comprises a programmable time interval.

28. The non-transitory computer-readable medium of claim 24, wherein the plurality of AMU statistics comprises one or more of a count of processor frequency cycles, a count of constant frequency cycles, a count of instructions retired, a count of front-end stalls, a count of memory stall cycles, a count of total demand misses of a last level cache (LLC), a count of front-end stalls that are memory-bound, a count of LLC demand accesses, a count of bus accesses, a count of bus access cycles, and a count of speculatively executed instructions.

29. The non-transitory computer-readable medium of claim 24, wherein the computer-executable instructions cause the processor device to generate the performance model by causing the processor device to calculate, for each frequency operating point of the one or more frequency operating points, a performance value comprising a product of the frequency operating point multiplied by an average number of instructions per clock cycle at the frequency operating point.

30. The non-transitory computer-readable medium of claim 24, wherein the computer-executable instructions cause the processor device to generate the EI model by causing the processor device to calculate, for each frequency operating point of the one or more frequency operating points, an EI value comprising a quotient of power consumption at the frequency operating point divided by a performance value for the frequency operating point.

31. The non-transitory computer-readable medium of claim 24, wherein the computer-executable instructions cause the processor device to generate the advantage model by causing the processor device to calculate the first rate of change of the performance model as a function of frequency divided by the second rate of change of the EI model as a function of frequency.

32. The non-transitory computer-readable medium of claim 24, wherein the computer-executable instructions cause the processor device to identify the target frequency operating point based on the advantage model by causing the processor device to determine a maximum frequency operating point that corresponds to an advantage value that is indicated by the advantage model as being greater than or equal to a threshold.

33. The non-transitory computer-readable medium of claim 32, wherein the threshold corresponds to a Quality of Service (QOS) hint provided by an operating system (OS) executed by the processor device.

34. The non-transitory computer-readable medium of claim 32, wherein the computer-executable instructions cause the processor device to determine the maximum frequency operating point by causing the processor device to determine the maximum frequency operating point as an interpolated value between an energy balanced frequency operating point and a performance frequency operating point, based on an energy performance preference (EPP) hint.

* * * * *